(No Model.) 2 Sheets—Sheet 1.
W. C. WALTER, Dec'd.
S. L. WALTER, Executrix.
ELECTRIC RAILWAY SIGNAL.
No. 453,097. Patented May 26, 1891.
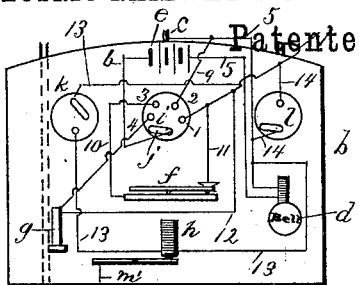
*Fig 1*
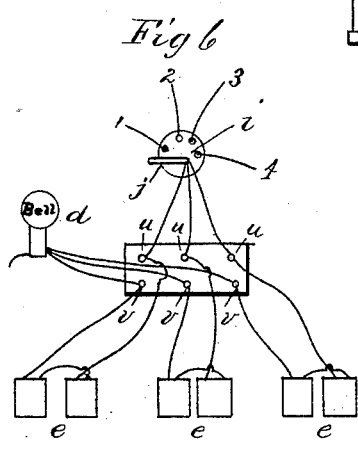
*Fig 6*
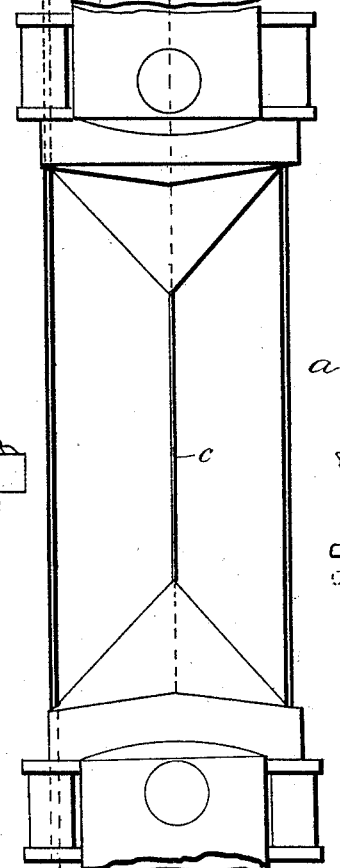
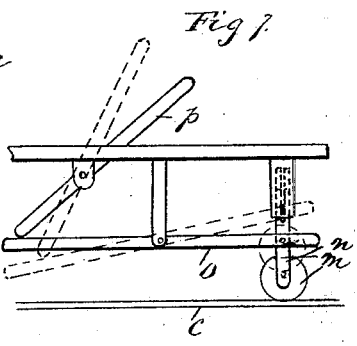
*Fig 7*
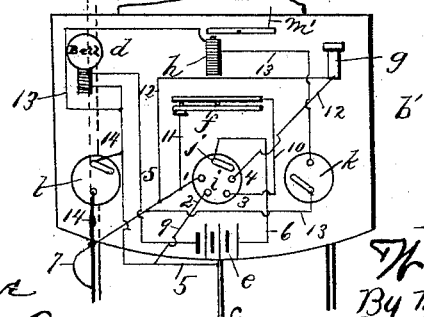
Witnesses
C. C. Burdine
H. E. Peck,
Inventor
W. C. Walter.
By his Attorney
O. E. Duff (No Model.) 2 Sheets—Sheet 2.
W. C. WALTER, Dec'd.
S. L. WALTER, Executrix.
ELECTRIC RAILWAY SIGNAL.
No. 453,097. Patented May 26, 1891.
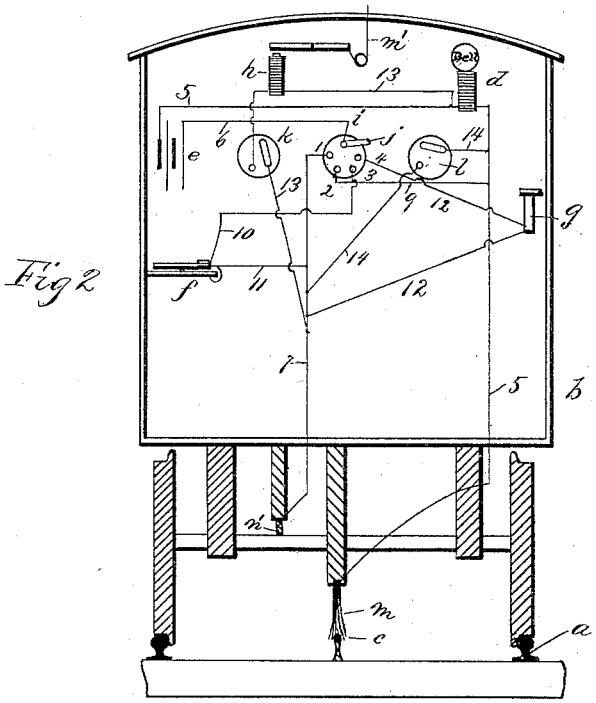
Fig 2.
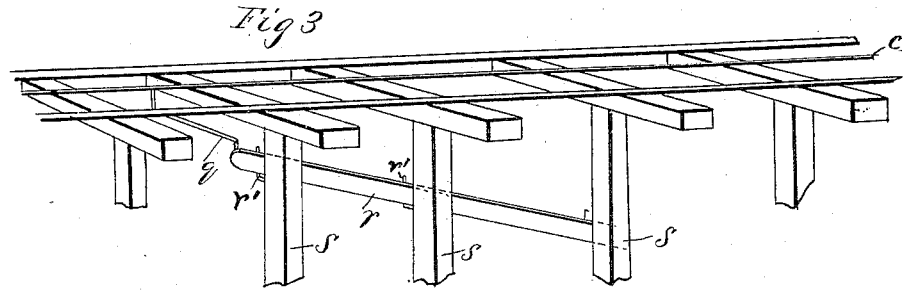
Fig 3.
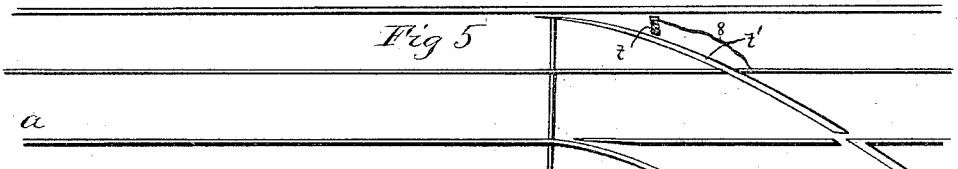
Fig 5.
Fig 4.
Witnesses
C. C. Burdine
H. E. Peck
Inventor
W. C. Walter,
By his Attorney

UNITED STATES PATENT OFFICE.

WILLIE COWLES WALTER, OF RICHMOND, VIRGINIA; SOPHIA LEE WALTER EXECUTRIX OF SAID WILLIE COWLES WALTER, DECEASED.

ELECTRIC RAILWAY-SIGNAL.

SPECIFICATION forming part of Letters Patent No. 453,097, dated May 26, 1891.

Application filed November 11, 1889. Serial No. 329,934. (No model.)

*To all whom it may concern:*

Be it known that I, WILLIE COWLES WALTER, of Richmond, in the county of Henrico and State of Virginia, have invented certain new and useful Improvements in Electric Railway-Signals; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to certain improvements in electric signaling systems.

The object of the invention is to provide an improved system of electric signaling for railroads, whereby the engineer of an approaching train will be notified in time to avoid danger if a switch is open or out of continuity with the track upon which his train is approaching, or if the rails have spread, or if a bridge has settled to a degree to become dangerous; also, whereby the engineers of two trains on the same track are placed in communication, so that both engineers will be notified by suitable alarms when the trains approach within such a distance of each other that the batteries will automatically overcome the resistance sufficiently to sound the alarm, and whereby the engineers on two vehicles can so control the circuits as to be placed in communication and be able to transmit intelligible signals from one moving vehicle to the other by means of common telegraph-keys and electric gongs, and also by telephones, if desired; and a further object is to provide an electric railway signaling system, whereby the whistles of one or both of the locomotives can be sounded from the other locomotive either automatically as a danger-alarm or to notify of the desire of one engineer to communicate with the engineer of the other train or vehicle, or each engineer can so set the signal that his whistle will be sounded when another train approaches on the same track, and also to so arrange the circuits and connections with switches that the operator or engineer can test the batteries and connections, &c., of his own vehicle at any time, and also to connect the battery-cells in a peculiar manner to utilize their full power. These objects are accomplished by and my invention consists in certain novel features of construction and in combinations of parts more fully described hereinafter, and particularly pointed out in the claims.

Referring to the accompanying drawings, Figure 1 is a plan of a section of railroad-track, showing two locomotives thereon broken away to show the circuits therein. Fig. 2 is a cross-section of a locomotive and the track showing the circuits, &c., in diagram therein. Fig. 3 is a detail perspective of a bridge provided with a safety attachment. Fig. 4 is a cross-section of the track, showing a means to ground the central conductor when the rails spread. Fig. 5 is a plan of a section of railroad-track, showing a switch and safety devices therefor. Fig. 6 is a detail diagram showing the manner of connecting the battery-cells. Fig. 7 is a detail view showing the construction rendering the contact running on the central conductor vertically adjustable.

In the drawings, the reference-letter *a* indicates a railroad-track, and *b b'* indicate two moving vehicles thereon. The series of rails on one side of the track are electrically connected to form a continuous electrical conductor; or the separate rails need not be connected with each other, but with the ground, so that a circuit can be grounded through them.

A continuous electrical conductor *c* extends the length of and parallel with the track between the rails or at any other convenient location and is insulated from the ground. The conductor shown in the drawings is secured to and insulated from the sleepers by suitable supports and is elevated to a plane above that of the rails, and this conductor is out of circuit unless a vehicle provided with an electrical attachment is located on the track.

Each vehicle is provided with a suitable electric alarm or gong *d*, a source of electricity or battery *e*, a telegraph-key *f*, a telephone receiver and transmitter *g*, and an electro-magnetic device *h*, normally out of circuit, the armature of which is connected by a connection *m'* with and adapted to open the whistle-valve when said mechanism is energized. Each locomotive is also provided with a four-way switch $i$, provided with the contact-lever $j$ and the four points 1 2 3 4, adapted to be separately engaged by said lever, and also with the two circuit-closers $k$ $l$, each provided with a stationary and a movable contact-point. A contact brush or wheel $m$ is carried by the locomotive and runs on the continuous conductor and is mounted on the end of a vertically-movable standard $n$ beneath the car, and this standard is raised and lowered to allow the contact brush or wheel to run on the conductor or to hold the contact above the same by means of a horizontally-swinging lever $o$, pivoted within its length beneath the car and having one end loosely connected to said standard and the other end bearing upwardly against the lower free end of a vertical lever $p$, pivoted within its length and extending upwardly into the car, so that when the free end of the lever is moved in one direction it forces down the free end of the horizontal lever and thereby raises the contact from the conductor when passing switches, &c., and when the operating-lever is moved in the opposite direction the free end of the horizontal lever is allowed to swing up and the contact to rest on the conductor.

In the vehicle the contact $m$, traveling on the conductor, is electrically connected with one pole of the battery through the electric alarm $d$ by wire 5, and the opposite pole of the battery is normally grounded through wire 6, the four-way switch, and wire 7, which is electrically connected with an axle or wheel by a brush $n'$ or other means, so that the battery can be grounded through the wheel and rail. One pole of the source $e$ is directly connected with the movable contact or lever $j$ of the four-way switch, and the ground or rail is electrically connected with stationary point 1 of the said switch, so that when the movable point is placed on the stationary point the line-conductor is grounded through the electric alarm and battery, and if the conductor is grounded at another point the circuit will be closed and the alarm sounded. Hence if two vehicles are approaching on the same track the line-conductor will be grounded through each vehicle, and hence the alarms in each will be sounded and the engineers thereby notified of danger in time to stop their trains or vehicles. At certain points along the track where there is danger or possibility of the rails spreading stationary contacts $o$ are rigidly secured and located on the outer sides of the rails a short distance from the same, Fig. 4. These contacts are insulated from the ground and each electrically connected with the signal line conductor by conductors 20, so that when a rail spreads outwardly it will electrically engage one of said contacts, and thereby ground the conductor through the rail, so that if a train approaches along the track the engineer will be notified of danger by the sounding of his alarm at a safe distance from the disarranged rail.

In Fig. 3 a device is shown for indicating upon an approaching train if a bridge is deranged or has sunk, and this arrangement consists in means for grounding the line conductor if the bridge sinks. A section of insulated wire or other conductor $q$ is electrically secured to the line conductor on the bridge and extends laterally from the same beneath the connected series of rails. At a point just below said rails the insulation is removed from said wire, so that if the same is brought into engagement with the rail the line conductor will be grounded. A beam $r$ is rigidly secured at one end to one of the bridge supports or uprights $s$ near one end of the bridge, and from thence extends transversely across several of the supports toward the center of the bridge until the conductor $q$ will rest on its upper free end. The uprights across which the beam passes are provided with brackets $r'$, forming supplemental supports for the beam. Thus if the bridge sinks or falls the rail will make electrical contact with the conductor $q$, supported by the beam.

In Fig. 5 an arrangement is shown whereby, if a switch is open or out of continuity with the main track upon which a train is approaching, the engineer of the approaching train will be duly notified of the danger by the sounding of his alarm. To accomplish this result a coil-spring $t$ or other suitable contact is suitably secured to a support and insulated from the ground and so located that when the switch $t'$ is thrown out of continuity with the main track, or to break the continuity of the main track and guide a train therefrom, the switch will engage said spring or contact $t$, and thereby ground the line conductor through the rail by means of the wire 8, connecting the line conductor and said spring-contact. When the switch-rail is thrown so that the main track is continuous, of course the switch-rail is disengaged from said spring. It should be observed that the line conductor is continuous and not broken up into blocks; but the distance that the signal will operate is according to the power of the batteries employed. If the batteries are weak, two trains will approach nearer to each other before the resistance will be overcome and the trains can communicate than if the batteries were stronger. Hence it might be said the battery-power forms "blocks."

Stationary point 2 of the four-way switch is connected by wire 9 with the wire 5 between the electric alarm $d$ and the brush $m$, so that if the contact-lever $j$ is placed on point 2 the battery and alarm in the engine will be short-circuited, and if the connections, &c., are all right the alarm will be sounded. This is intended as a precautionary measure to allow the engineer to test his bell and battery before starting out on a trip, the circuit being completed through the four-way switch, wire 9, wire 5, and the bell, the battery, and wire 6.

Stationary point 3 of the four-way switch is connected by wire 10 with one point of the telegraph-key $f$, and the other corresponding point of said key is connected to the main wire 7 between the four-way switch and the ground by a wire 11, so that when the lever $j$ is placed on point 3 the circuit can be made and broken by the telegraph-key; and hence if another train is on the track the circuit will be correspondingly made and broken through the other locomotive, and the signals will be indicated by the sounding of the bell, the circuit passing from the ground through wires 7 and 11 to the key and wire 10, the four-way switch, wire 6, and the battery-wire 5 (including the bell) to the line conductor and other train.

Stationary point 4 is connected by the wire 12 with the wire 7 at a point between the switch and the ground, and this wire includes the telephone receiver and transmitter $g$, so that if it is desired to telephone from one train to another, or from a train to a station, the desire is indicated by suitable signals, and the lever $j$ is placed on point 4, the circuit being the same as that just described, except through wire 12 and the receiver, instead of through wires 10 and 11. A short circuit 13 connects the wire 7 between the ground and the four-way switch, and the wire 5 between the battery and the line conductor, and this short circuit includes the whistle-blowing magnetic device $h$ and a circuit-closer $k$. Hence when this short circuit is completed by the circuit-closer $k$, and when another train approaches on the track, the circuit will be closed and the electro-magnetic device energized and the whistle sounded, the magnet $h$ being preferably of less resistance than magnet of bell $d$. The main wires 5 and 7 between the switch and the ground and the bell and the line conductor are connected by a short circuit 14, including circuit maker and breaker 1, so that the engineer, before starting out, can not only test his battery and bell by the short circuit 9, but by closing short circuit 14 and placing the switch-lever $j$ successively on the four points of the switch all the circuits in the locomotive can be tested.

In Fig. 6 the preferred method of connecting the batteries in the locomotive to utilize the full strength is shown. Three pairs of cells are shown connected in parallel, so that the current from each cell is thrown separately into the circuit without passing through the other cells. Two unlike electrodes of each pair of cells are electrically connected, and the other opposite poles are respectively connected to two insulated binding-posts or contacts $u$ $v$, and as there are three of these pairs of cells there are three pairs of said contacts secured to a suitable board, and all the contacts $u$ connected with like poles of the cells are electrically connected with the contact-lever $j$ of the four-way switch, and all the contacts $v$ connected with the opposite poles are connected with the bell $d$.

It is evident that various changes might be made in the form, arrangements, and connections of the various parts described without departing from the spirit and scope of my invention.

What I claim is—

1. An electric railroad signaling system comprising a conductor extending parallel with the track and insulated from the ground and a stationary contact insulated from the ground and located beside and normally out of engagement with a rail and electrically connected with said conductor, substantially as described.

2. In an electric railway-signal, the combination of a conductor extending along the track, a vehicle on the track containing a main circuit including a source of electricity and an alarm and connected with said conductor, a series of short circuits in the vehicle, including a telephone, telegraph-key, a switch whereby they can be thrown into or out of the main circuit, and means whereby all the circuits in the vehicle can be short-circuited, substantially as described.

3. In an electric railway-signal, the combination of a track, a line conductor extending parallel with the same, a stationary contact arranged to electrically engage a rail when displaced, a conductor connecting said contact and line conductor, and a vehicle on the track containing an alarm-circuit connected with said line conductor, substantially as described.

4. In an electric railway-signal, the combination, with the track and a bridge or trestle-work, of a line conductor extending along the track and over the bridge or trestle, a movable conductor on the bridge or trestle electrically connected with the line conductor and extending laterally beneath and normally out of contact with a rail, and means, substantially as described, carried by the bridge to throw said lateral conductor into engagement with the rail when the bridge or trestle sinks.

5. In an electric railway-signal, the combination, with the track and a line conductor extending parallel with the track, of a vehicle on the track, a vertically-movable standard carried by the vehicle and carrying a contact to run on the conductor, a horizontal rocking-lever beneath the car at one end loosely connected with the standard to raise and lower the same, and an upright rocking operating-lever extending up into the car and having its lower end bearing against the free end of said horizontal lever to rock the same, substantially as described.

6. In an electric railway-signal, the combination, with a track and line conductor extending along the track, of a vehicle on the track containing a main circuit connected at one end with said conductor and at the other end with the rails, a source of electricity, and an alarm in said circuit and vehicle, a telegraph-key and a telephone in the vehicle and in separate short circuits from said main circuit, and a switch in the vehicle arranged to separately throw said key and said telephone into or out of said main circuit and to close the main circuit in said vehicle to test the alarm and source, substantially as described.

7. In combination, the rails of a railroad-track, a single continuous insulated line conductor extending along the same, a vehicle having a partial circuit electrically connected with said line conductor and containing an alarm and battery, and a normally-open circuit-closer having one contact connected electrically with said line conductor, said circuit-closer being located beside the track and closed by the outward movement of a rail to close a circuit through said partial circuit of the vehicle, substantially as described.

8. In combination, a railroad-track, a switch therein, a continuous insulated line conductor extending along the track, a vehicle containing a partial electric circuit electrically connected with said conductor and including a battery and alarm, the other end of said circuit connected with a return-circuit, and a normally-open circuit-closer at the switch having one contact electrically connected with said conductor, another contact of said closer moving with the switch to close said circuit when the switch is thrown from continuity with the main track.

9. In an electric railroad-signal, the combination of an insulated line conductor extending along the track, a bridge or trestle-work over which said conductor passes, a normally-open circuit-closer on the bridge electrically connected with said conductor and with the ground, and means, substantially as described, on the bridge to close said closer when the bridge sinks.

10. A system for signaling between trains, consisting in the combination of the electrically-continuous insulated conductor extending along the track, two vehicles on the track, each containing a main circuit in electrical communication with said conductor, a battery and an alarm on each vehicle and in the main circuit thereof, a series of short circuits in each vehicle from the main circuit thereof, telegraph-instruments in said short circuits, and switches whereby they can be thrown into or out of the main circuit and whereby the vehicle-circuits can be short-circuited.

11. A system of electrical signaling consisting of a source of electricity, conductors leading therefrom and electrically connected with the track, appliances connected with trestle-works or bridges on the line of the track and also connected with the track, whereby the breaking or destruction of a bridge or trestle closes the circuit, and alarm mechanism located on the train and in the circuit.

In testimony that I claim the foregoing as my own I affix my signature in presence of two witnesses.

WILLIE C. WALTER.

Witnesses:
O. E. DUFFY,
C. M. WERLE,
H. E. PECK.